US 7,886,018 B2

(12) United States Patent
Tseitlin et al.

(10) Patent No.: US 7,886,018 B2
(45) Date of Patent: Feb. 8, 2011

(54) PORTABLE METADATA SERVICE FRAMEWORK

(75) Inventors: Ariel D. Tseitlin, Sunnyvale, CA (US); Daniel Kearns, Moss Beach, CA (US); George Datuashvili, Cupertino, CA (US); Gilberto Arnaiz, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1033 days.

(21) Appl. No.: 11/426,264

(22) Filed: Jun. 23, 2006
(Under 37 CFR 1.47)

(65) Prior Publication Data
US 2007/0250606 A1  Oct. 25, 2007

Related U.S. Application Data

(60) Provisional application No. 60/693,697, filed on Jun. 24, 2005.

(51) Int. Cl.
*G06F 15/16* (2006.01)

(52) U.S. Cl. .................. 709/217; 709/201; 709/218; 709/219; 709/226; 709/229

(58) Field of Classification Search .................. 709/224, 709/226, 201, 217, 218, 219, 229
See application file for complete search history.

(56) References Cited

U.S. PATENT DOCUMENTS

| | | | | |
|---|---|---|---|---|
| 5,432,937 | A | 7/1995 | Tevanian et al. | 717/162 |
| 5,583,983 | A | 12/1996 | Schmitter | 717/138 |
| 5,826,265 | A | 10/1998 | Van Huben et al. | 707/E17.005 |
| 5,920,867 | A | 7/1999 | Van Huben et al. | 707/E17.007 |
| 5,943,674 | A | 8/1999 | Schofield | 717/140 |
| 6,074,432 | A | 6/2000 | Guccione | 717/163 |
| 6,199,195 | B1 | 3/2001 | Goodwin et al. | 717/108 |
| 6,473,748 | B1 | 10/2002 | Archer | 706/45 |
| 6,477,434 | B1 * | 11/2002 | Wewalaarachchi et al. | 700/83 |
| 6,571,140 | B1 * | 5/2003 | Wewalaarachchi et al. | 700/83 |
| 6,738,975 | B1 | 5/2004 | Yee et al. | 719/310 |

(Continued)

OTHER PUBLICATIONS

Polze, Andreas, "Component Programming with J2EE and .NET."; Feb. 27, 2004, Discourse lectures at the Berlin Distributed Computing Laboratory, Downloaded fom http://user.cs.tu-berlin.de/~mwerner/discourse/BlockLVS04/slides/Components.pdf on Jun. 14, 2004; pp. 1-10.

(Continued)

*Primary Examiner*—Liangche A Wang
(74) *Attorney, Agent, or Firm*—Campbell Stephenson LLP

(57) ABSTRACT

A method is provided. The method determines a set of components to include in an enterprise module. Further, the set of components is divided into a set of platform dependent components and a set of platform independent components. In addition, abstract computer code is prepared for each of the components in the set of platform dependent components according to at least one of a plurality of high-level abstract computer languages. Further, the abstract computer code is provided to a transmogrifier to automatically generate platform dependent source code. In addition, the platform independent source code is prepared for the set of platform independent components. The enterprise object code is generated by compiling and linking the platform dependent source code and the platform independent source code.

20 Claims, 7 Drawing Sheets

U.S. PATENT DOCUMENTS

| | | | |
|---|---|---|---|
| 6,782,448 B2 | 8/2004 | Goodman et al. | 717/170 |
| 6,971,090 B1 | 11/2005 | Gruttadauria et al. | 717/136 |
| 7,076,765 B1 | 7/2006 | Omori | 717/165 |
| 7,234,111 B2 | 6/2007 | Chu et al. | 715/251 |
| 7,293,261 B1 | 11/2007 | Anderson et al. | 717/137 |
| 7,293,262 B2 | 11/2007 | Sengodan | 717/136 |
| 7,340,718 B2 | 3/2008 | Szladovics et al. | 717/106 |
| 7,444,625 B2 | 10/2008 | Anwar et al. | 717/140 |
| 2004/0187140 A1 | 9/2004 | Aigner et al. | 719/328 |
| 2004/0223009 A1 | 11/2004 | Szladovics et al. | 345/760 |
| 2005/0037735 A1* | 2/2005 | Coutts | 455/411 |
| 2005/0240558 A1* | 10/2005 | Gil et al. | 707/1 |
| 2006/0080682 A1 | 4/2006 | Anwar et al. | 719/331 |
| 2006/0117298 A1 | 6/2006 | Delapedraja et al. | 717/120 |
| 2006/0184980 A1 | 8/2006 | Cole | 725/100 |

OTHER PUBLICATIONS

Moore, Bill, et al., "Migrating WebLogic Applications to WebSphere Advanced Edition," IBM Redbooks, Jan. 2001, pp. 17-31.

* cited by examiner

PORTABLE METADATA SERVICE FRAMEWORK

RELATED APPLICATION

This application claims the benefit of and priority to U.S. Provisional Application Ser. No. 60/693,697, filed Jun. 24, 2005, the contents of which are incorporated by reference herein in its entirety.

BACKGROUND

1. Field

A method and system are disclosed which generally relate to computer application environments.

2. General Background

Computer systems form the backbone of modern business. Computer systems are used in virtually every step of a business chain. For example, computer systems are used to purchase source materials, track production, monitor inventory levels, monitor quality, set pricing, maintain customer relationships, provide accounting services, maintain a payroll, provide employee benefits, track inbound/outbound shipments, track customer satisfaction or complaints, and perform countless other tasks to run a business.

A number of enterprise software applications have been created to allow a business to perform many of these business support functions with a single integrated software application. These enterprise software applications have provided the businesses that employ these applications with a competitive advantage. However, such enterprise software applications tend to be expansive applications that require significant computer resources to run and knowledgeable technicians to maintain. Furthermore, enterprise software applications tend to be expensive programs to purchase or lease. Thus, enterprise software applications have mainly been used only by very large corporations that are able to afford such infrastructure investments and continue to pay for their continued use.

Even very large corporations can have some difficulties with large enterprise software applications. For example, a large corporation may already have a legacy software application that the large corporation wishes to continue using. Thus, integrating the legacy software application with a new enterprise software application can be difficult and require very skilled application integrators.

Furthermore, corporations in different business segments often have very different needs from their enterprise software applications. Therefore, a corporation using with a "one-size-fits-all" enterprise software application may find that the "one-size-fits-all" enterprise software includes many unnecessary features. These unnecessary features needlessly cost the corporation money and consume valuable computer resources. The enterprise software application may also be missing a number of desired industry-specific features for each different corporation. These corporations must develop these missing features internally or find another software application that provides the needed features. If an additional software application that provides the missing features is located, then the corporation must integrate that additional application with the enterprise software application.

Due to these difficulties with large enterprise software applications, it would be desirable to fine a way to make such enterprise software applications more flexible. Specifically, it would be desirable to allow small businesses to be able to afford some of the features provided by enterprise software applications. Similarly, it would be desirable to allow large corporations to easily select and install only the needed features. And finally, it would be desirable to have an ability to easily integrate the enterprise software application with other customized applications.

SUMMARY

In one aspect of the disclosure, a machine readable medium has stored thereon a set of instructions which when executed perform a method. The method determines a set of components to include in an enterprise module. Further, the set of components is divided into a set of platform dependent components and a set of platform independent components. In addition, abstract computer code is prepared for each of the components in the set of platform dependent components according to at least one of a plurality of high-level abstract computer languages. Further, the abstract computer code is provided to a transmogrifier to automatically generate a plurality of platform dependent artifacts. In addition, platform independent source code is prepared for the set of platform independent components. Further, enterprise object code is generated by compiling and linking the platform independent source code and at least a subset of the plurality of platform dependent artifacts. The platform dependent object code and the plurality of platform dependent artifacts are packaged into the enterprise module.

In another aspect of the disclosure, a method is provided. The method determines a set of components to include in an enterprise module. Further, the set of components is divided into a set of platform dependent components and a set of platform independent components. In addition, abstract computer code is prepared for each of the components in the set of platform dependent components according to at least one of a plurality of high-level abstract computer languages. Further, the abstract computer code is provided to a transmogrifier to automatically generate platform dependent source code. In addition, the platform independent source code is prepared for the set of platform independent components. The enterprise object code is generated by compiling and linking the platform dependent source code and the platform independent source code.

In yet another aspect of the disclosure, a system is provided. The system has a unit that selects an enterprise module from a plurality of enterprise modules. The plurality of enterprise modules compose an enterprise application. Each of the enterprise modules includes enterprise object code generated from platform independent source code and at least a subset of a plurality of platform dependent artifacts. Further, the system has a unit that provides the enterprise module to an application server. The application server has stored thereon a software application generated from platform dependent object code. In addition, the system has a unit that integrates the enterprise module with the software application.

BRIEF DESCRIPTION OF DRAWINGS

The above-mentioned features and objects of the present disclosure will become more apparent with reference to the following description taken in conjunction with the accompanying drawings wherein like reference numerals denote like elements and in which.

DETAILED DESCRIPTION

A method and apparatus for implementing a portable and open standards-based business application platform are disclosed. In the following description, for purposes of explanation, specific nomenclature is set forth to provide a thorough understanding of the present disclosure. However, it will be apparent to one skilled in the art that these specific details are not required in order to practice the method and apparatus disclosed herein. For example, although reference is made to the J2EE and .Net application platforms, the same techniques can easily be applied to other types of application platforms.

Certain computer application tasks require very large and complex computer software applications. For example, running an entire business operation requires a very large application (an "enterprise application") that can handle many different tasks. Providing such large and complex enterprise software applications to a customer can be a great challenge to the enterprise software application developer.

Monolithic Application Executing at Customer Site

Figure 1:
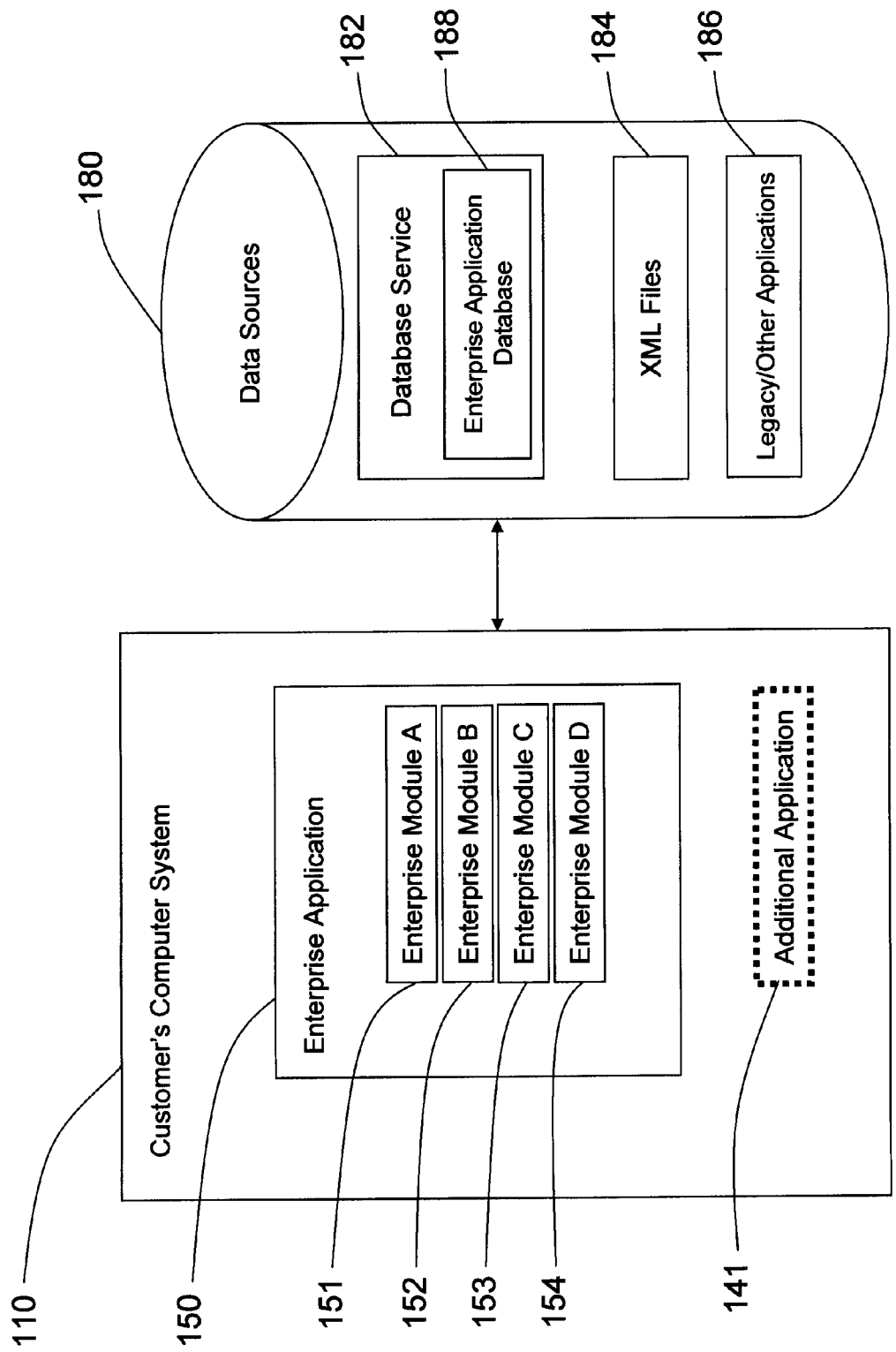
FIG. 1 illustrates infrastructure utilized in a large and complex application, such as an enterprise application.

FIG. 1 illustrates infrastructure utilized in a large and complex application, such as an enterprise application. The infrastructure can be provided to the client by installing the enterprise application onto computers owned by the customer at the customer's premises. For instance, an enterprise application 150 can be installed to run on a customer's computer system 110. The enterprise application 150 may use data and/or services from the data sources 180, which include a database service 182, XML files 184, and legacy/other applications 186. Further, the database service 182 stores an enterprise application database 188.

The enterprise application 150 can be an expensive application, to purchase or lease, which utilizes significant computer resources. Further, installing and maintaining the enterprise software application 150 may require knowledgeable technicians. Thus, a smaller business might not want to use the large and complex enterprise application 150.

Even large corporations with significant computer resources and budgets may have difficulties with the large enterprise application. For example, a large corporation may already have a legacy software application that the corporation wishes to continue using. Thus, integrating the legacy software application with a new enterprise application 150 can be difficult and require very skilled application integrators.

The enterprise module 150 can include a variety of components, which form the building blocks of the enterprise module 150. An example of a component is a module, which is a collection of computer code that can be written to provide a service.

The enterprise application 150 may consist of many different individual modules. For example, as illustrated in FIG. 1, the enterprise module 150 can be composed of four individual enterprise modules: enterprise module A 151, enterprise module B 152, enterprise module C 153, and enterprise module D 154. A customer may need some of the enterprise modules while not needing others. For instance, a corporation may have use for the enterprise module A 151 and the enterprise module B 152, but may have no use for the enterprise module C and the enterprise module D. Further, the corporation may need an additional module that is not provided in the enterprise application 150. In those situations, the customer develops internally or purchases an additional application 141 that provides the features of the additional module. If an additional application 141 that provides the missing features is located, then the corporation must integrate that additional application 141 with the enterprise application 150. FIG. 1 illustrates the additional application 141 being integrated with the enterprise application 150. Such development is expensive because technical skills are needed to locate or develop the additional application 141 and then integrate the additional application 141 with the enterprise application 150. Accordingly, the corporation may not find the "one-size-fits-all" enterprise application 150 to be an optimal solution for its needs.

On-Line or Hosted Application Services

Figure 2:
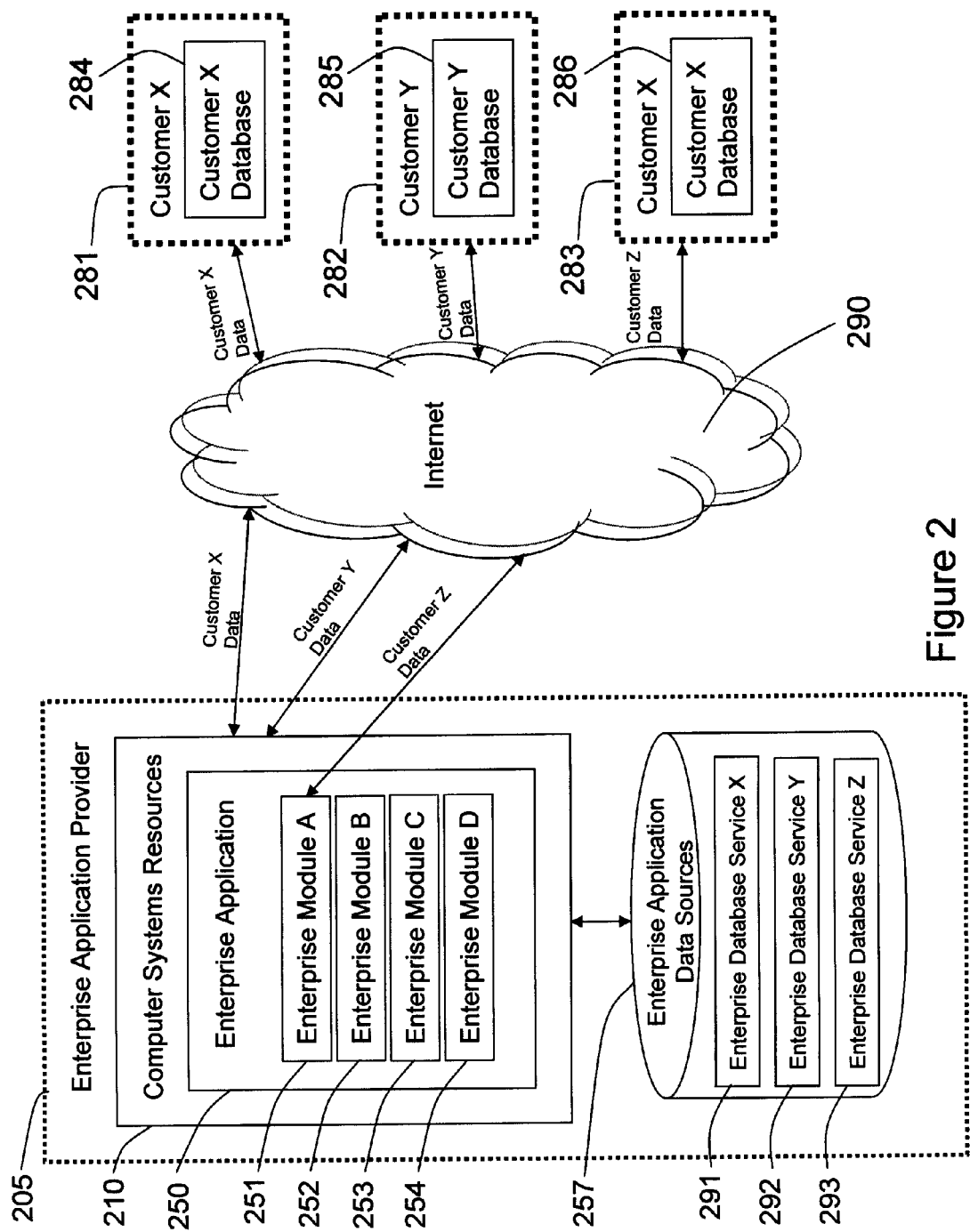
FIG. 2 illustrates an on-line or hosted infrastructure that can be utilized to provide an enterprise application over the Internet.

As an alternative to the monolithic enterprise software applications discussed above, enterprise application services can be provided to customers over the Internet. FIG. 2 illustrates an on-line or hosted infrastructure that can be utilized to provide an enterprise application 250 over the Internet 290. Specifically, an enterprise application provider 205 hosts the enterprise application 250 on a server and allows customers to access the server on-line. The server can be located at the enterprise application provider's facility. The enterprise application 250 mainly uses computer system resources 210 provided by the enterprise application provider 205. Customers such as customer X 281, customer Y 282, and customer Z 283 can access the enterprise application 250 over the Internet 290. Each of the customers can have a database. For instance, the customer X 281 may have a customer X database 284, the customer Y 282 may have a customer Y database 285, and the customer Z 283 may have a customer Z database 286. The enterprise application provider 205 keeps track of the different customer data using different database services in the enterprise application data sources 257, such as enterprise database service X 291 for customer X 281, enterprise database service Y 292 for customer Y 282, and enterprise database service Z 293 for customer Z 283.

Accordingly, the infrastructure of FIG. 2 allows small businesses to enjoy enterprise application services without needing to install and maintain a large enterprise application. Customers can access, and pay for, only portions of the enterprise application 250. For example, the customers X 281 and Y 282 send and receive data to and from all of the computer resources 210, thereby accessing the entire enterprise application 250 and all the enterprise modules, while customer Z 283 sends and receives data to and from only the enterprise module C 253, thereby accessing only enterprise application module C 253.

Enterprise Module Assembly of Enterprise Application Services

A customer that prioritizes having the enterprise application 150 on the customer's premises may purchase the "one-size-fits-all" enterprise application 150 of FIG. 1. Further, a customer that prioritizes maintaining low costs, e.g., a small business, may purchase individual modules of the enterprise application 250 of FIG. 2 to obtain limited enterprise application services at a lower cost than purchasing the entire "one-size-fits-all" enterprise application 150.

Figure 3:
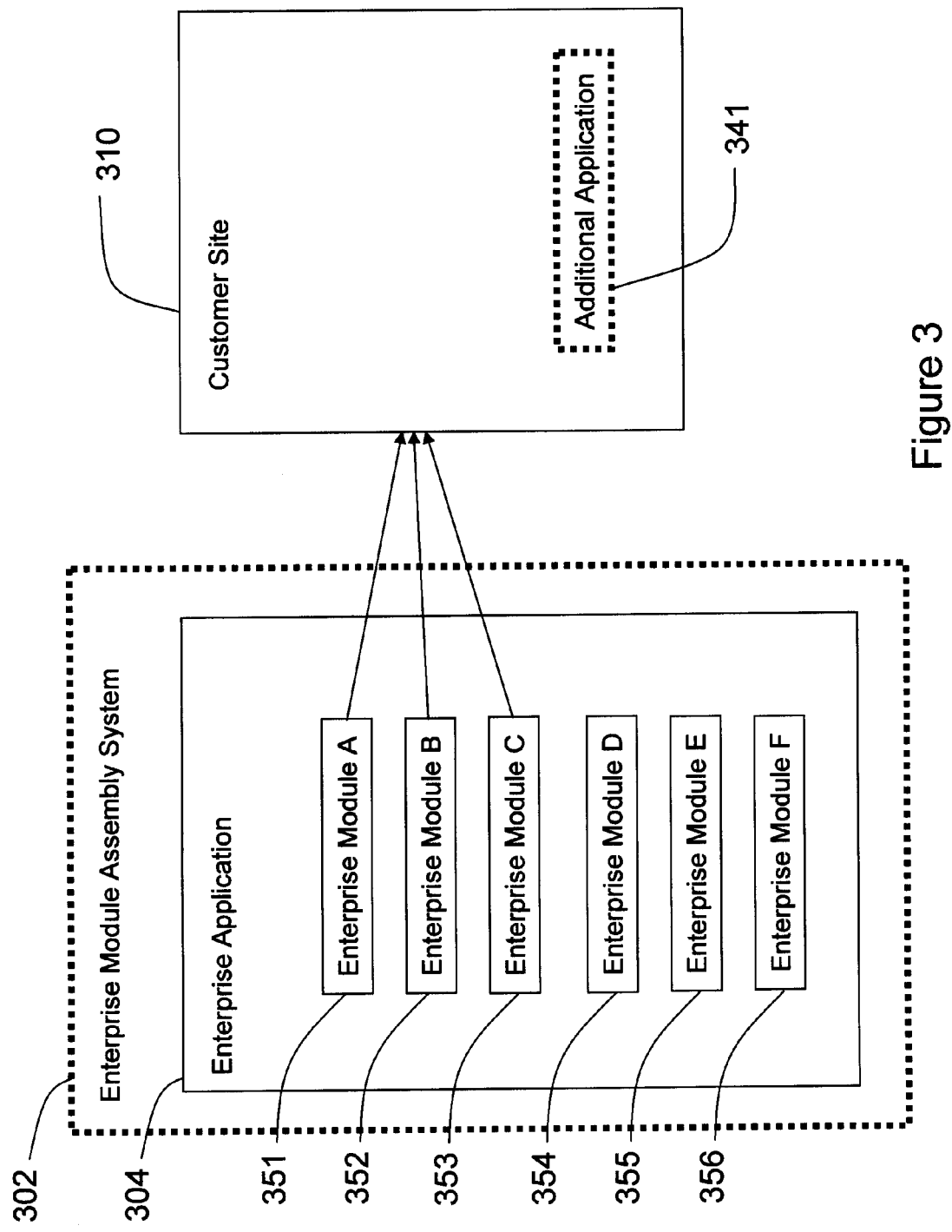
FIG. 3 illustrates an enterprise module assembly system that allows a customer to both host the enterprise application software locally and only purchase the particular modules corresponding to the services that the customer actually needs.

FIG. 3 illustrates an enterprise module assembly system 302 that allows a customer to both host the enterprise application software locally and only purchase the particular modules corresponding to the services that the customer actually needs. In addition, the enterprise module assembly system 302 allows a customer to integrate existing and/or new software on the customer's system with the enterprise modules that are purchased. Accordingly, the customer can assemble enterprise modules for particular services of an enterprise application in combination with the existing and/or new software on the customer's system.

In one embodiment, the enterprise module assembly system 302 breaks up an enterprise application 304 into individual enterprise modules. The enterprise application 304 can be a large complex computer application, e.g. an enterprise application or an even larger complex application program. The customer can then select the individual enterprise modules that the customer would like to utilize. Each of the enterprise modules can provide a different service. For instance, the enterprise application 304 may provide an enterprise module A 351 for purchasing source materials, an enterprise module B 352 for tracking production, an enterprise module C 353 for monitoring inventory levels, an enterprise module D 354 for monitoring quality, an enterprise module E 355 for setting pricing, and an enterprise module F 356 for maintaining customer relationships. The customer may then select which of these enterprise modules it would like to purchase. For instance, in FIG. 3, the customer has selected the enterprise module A, the enterprise module B, and the enterprise module C, but has not selected the enterprise module D, the enterprise module E, or the enterprise module F. The customer may not have selected the enterprise module D because the customer may already have existing software for monitoring quality. Further, the customer may not have selected the enterprise module E because, in the context of its business, the customer does not need any software for setting pricing. Finally, the customer may not have selected the enterprise module F because the customer plans on internally developing an additional application 341 for maintaining customer relationships.

The enterprise modules can be provided to the customer in a variety of ways. For instance, technicians can physically install the enterprise modules, which the customer has selected, at the customer site 310. Alternatively, the enterprise modules can be transmitted through a network, such as the Internet, to the customer site 310.

In another embodiment, the enterprise module assembly system 302 creates the enterprise modules as opposed to breaking up an existing enterprise application 304. In other words, the enterprise module assembly system 302 can create a collection of enterprise modules, each corresponding to a particular service, and allow a customer to select the enterprise modules that it would like to utilize.

Figure 4:
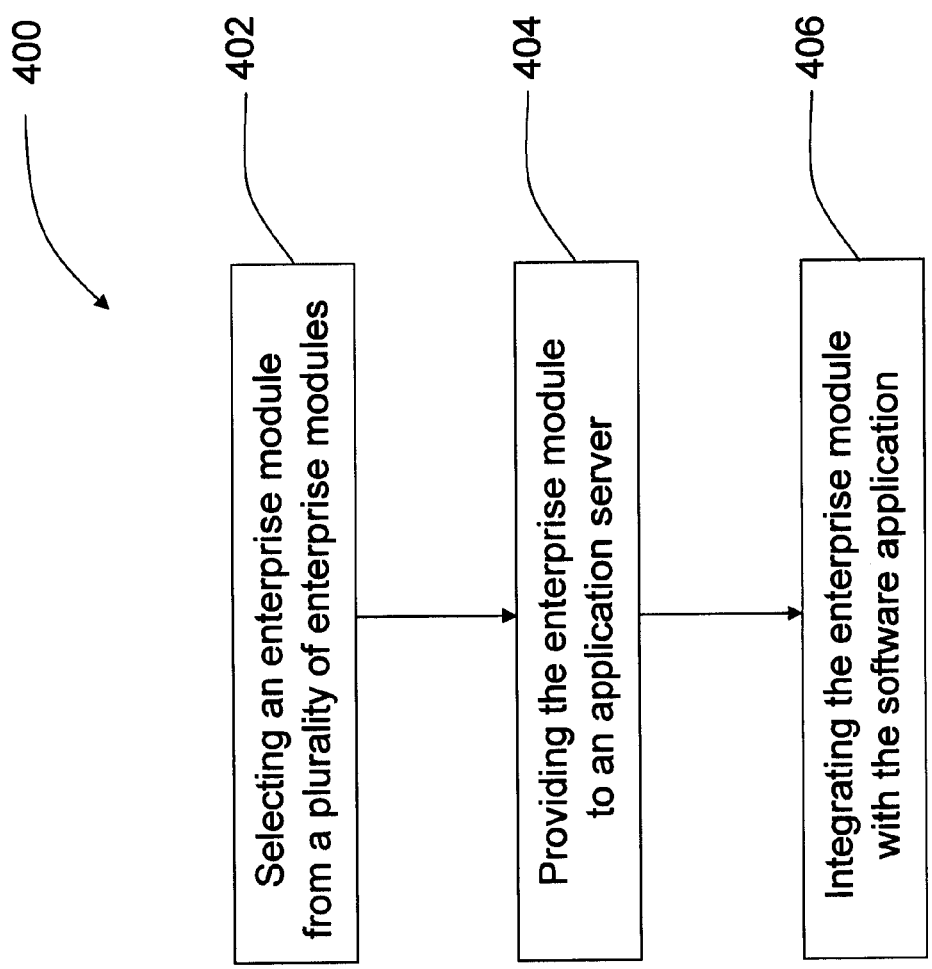
FIG. 4 illustrates a process of enhancing a computer system.

FIG. 4 illustrates a process 400 of enhancing a computer system. At a process block 402, the process 400 selects an enterprise module from a plurality of enterprise modules. The plurality of enterprise modules compose an enterprise application. Further, each of the enterprise modules includes enterprise object code generated from platform dependent source code and at least a subset of a plurality of platform dependent artifacts. As will be explained below, a developer can utilize the following to compose one of the enterprise modules: (1) high-level abstract languages to automatically generate platform dependent artifacts and (2) platform independent source code. The developer can essentially proceed with development in a portable manner because the developer can utilize a certain set of high-level abstract languages and platform independent source code irrespective of the customer's native software and hardware environment. Further, the enterprise module is developed according to an open standard because the enterprise object code is platform dependent to the specific customer's native software and hardware environment. At a process block 404, the enterprise module is provided to an application server. The application server stores a software application, which is generated from platform dependent object code. In addition, at a process block 406, the enterprise module is integrated with the software application.

Figure 5:
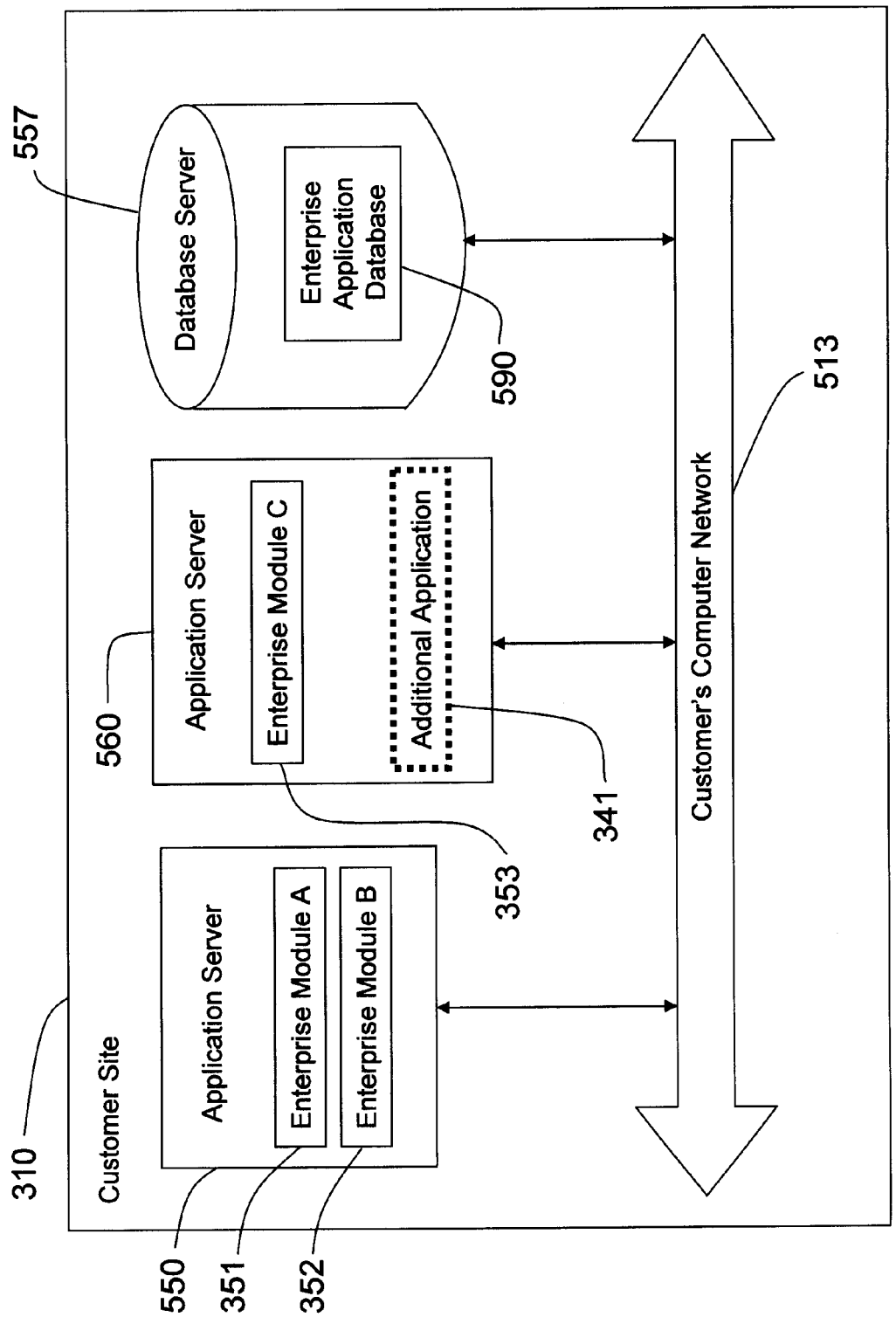
FIG. 5 illustrates an expanded view of the customer site, as seen in FIG. 3, for which the customer can implement the selected enterprise modules.

FIG. 5 illustrates an expanded view of the customer site 310, as seen in FIG. 3, for which the customer can implement the selected enterprise modules. For example, as seen in FIG. 3, the customer selects the enterprise module A, the enterprise module B, and the enterprise module C, but not the enterprise module D, the enterprise module E, or the enterprise module F. The customer may implement the selected enterprise modules on application servers, as illustrated in FIG. 5. For instance, the customer can host the enterprise module A 351 and the enterprise module B 352 on an application server 550. The application server 550 can then provide the services offered by the enterprise module A 351 and the enterprise module B 352. Further, the customer can host the enterprise module C 353 on a different application server 560. The other application server 560 may also host the additional application 341 that the customer internally developed, purchased, etc. In one embodiment, the additional application 341 includes platform dependent object code that is specific to the software and hardware at the customer site 310. While a developer composing the enterprise module C 353 was able to utilize high-level abstract languages and platform independent source code to prepare the code for the enterprise module C 353, the packaged enterprise module C 353 includes enterprise object code that is platform dependent specific to the software and hardware at the customer site 310. Since the enterprise module C 353 and the additional application 341 both include platform dependent object code compatible with the same platform, the enterprise module C 353 and the additional application 341 can be easily integrated with one another.

In addition, the customer site 310 has an enterprise application database 590 that is hosted on a database server 557. The enterprise application database 557 can store information related to each of the enterprise modules and the additional application 341 so that particular enterprise modules and/or the additional application 341 can be searched for. In addition, the customer site 310 has a computer network 513 through which the enterprise module A 351, the enterprise module B 352, the enterprise module C 353, the additional application 341, and the enterprise application database service 590 can all communicate with one another. For instance, although the enterprise module A 351 is stored on a different server than the additional application 341, the enterprise module A 351 and the additional application 341 can still communicate with one another.

Accordingly, a customer can utilize some or all of the individual enterprise modules from the enterprise application 304 (FIG. 3). The customer site 310, as illustrated in FIG. 5, can provide an open standards platform that has many tools and services for application development, application integration, and application management. Thus, a customer can easily create new application programs, e.g., the additional application 341, integrate the new application programs with the enterprise modules, and manage the enterprise modules and the new applications.

Composition of an Enterprise Module

A discussion shall now be provided regarding how an enterprise module is generated. For ease of discussion, the enterprise module A 351, as seen in FIG. 3, shall be utilized as an example of an enterprise module.

The enterprise module A 351 is constructed so that it (1) is portable and (2) utilizes an open standards platform. By being portable, the code utilized to create the enterprise module A 351 can compile and run on more than one application platform. For ease of discussion, examples shall be provided herein that utilize J2EE and .NET, which are well known platforms to one of ordinary skill in the art. However, other platforms known to one of ordinary skill in the art can easily be utilized. By being open, as discussed above, the enterprise object code included in the enterprise module A 351 is platform dependent so that the enterprise module A 351 can be easily integrated with other applications, e.g. the additional application 341 (FIG. 3), that have object code for the same platform that the customer utilizes.

Figure 6:
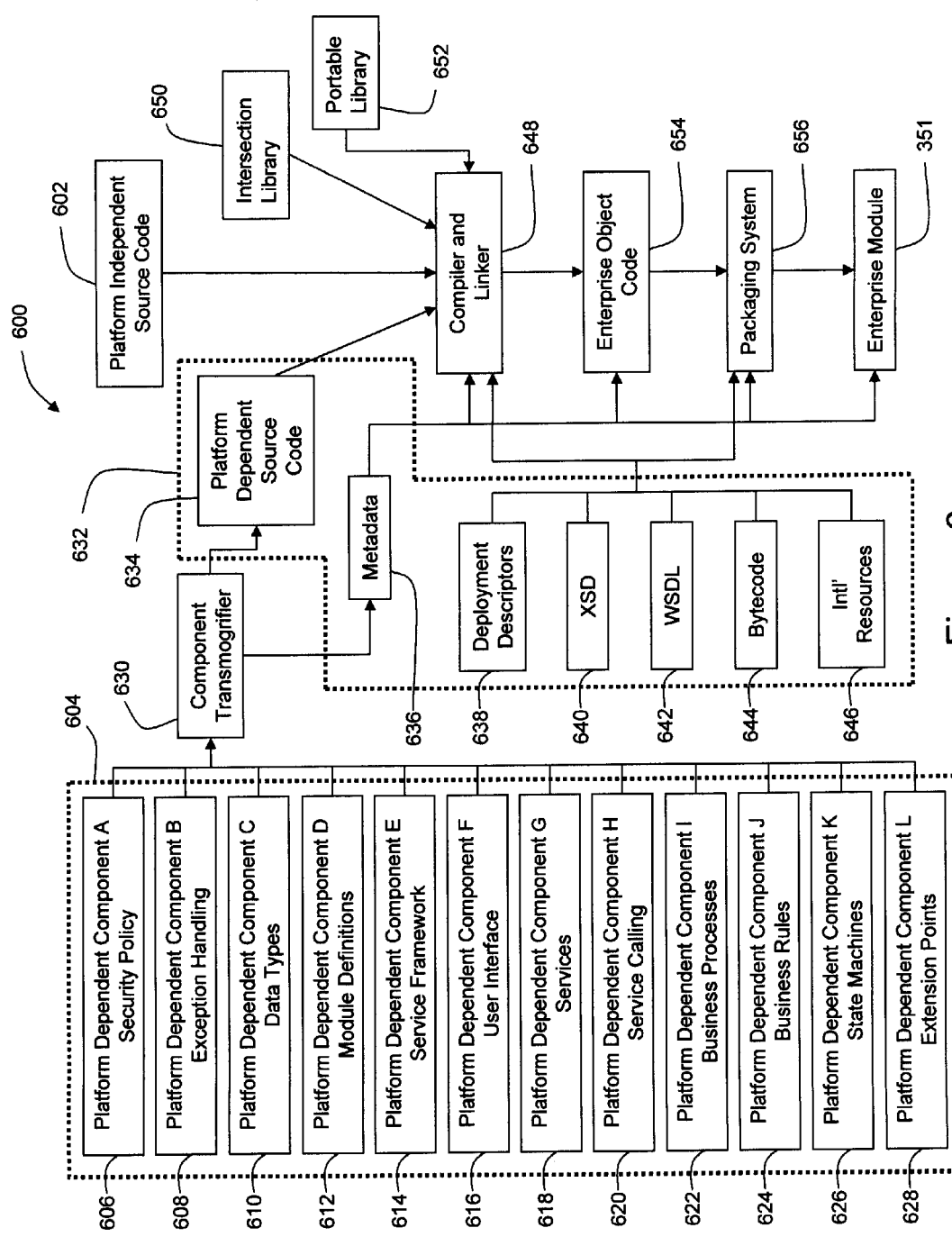
FIG. 6 illustrates an enterprise module construction system.

FIG. 6 illustrates an enterprise module construction system 600. The enterprise module construction system 600 can be utilized to construct the enterprise module A 351. The enterprise module A 351 is essentially constructed by combining platform independent source code 602 and a plurality of platform dependent components 604.

Initially, a developer determines what components of the enterprise module are platform independent and what components are platform dependent. In other words, in order for the enterprise module to eventually become native to a customer's system, some components of the enterprise module will require data specific to the individual customer's platform while other components of the enterprise module will not require data specific to the individual customer's platform.

The main algorithms utilized by the enterprise module A 351 are mostly not specific to the actual platform on which the enterprise module A 351 is being implemented. Accordingly, a large portion of these algorithms can be coded in platform independent source code 602. The platform independent source code 602 can be a subset of the syntax language of one or more platform independent languages. Accordingly, the platform independent source code 602 can be compiled on any of the compilers that support one of the platform independent languages utilized for the subsets. For instance, the platform independent source code 602 can be a subset of the syntax language for .Net and J2EE. If the function for concatenate is "concat" in both .Net and J2EE, then the subset includes the function "concat". If the compiler supports .Net, then the use of the function "concat" is accepted by the compiler. Similarly, if the compiler supports J2EE, then the use of the function "concat" is also accepted by the compiler. An example of a subset of syntax language is a subset of the Java 1.1.4 computer language. The subset can be compiled on either a .Net or J2EE compiler.

However, some services are platform specific. For instance, the security policy for the enterprise module A 351 may vary significantly from one platform to another. The high-level abstract languages provide the developer with a way of coding the plurality of platform dependent components 604 in a portable manner. In other words, the developer does not have to actually code each of the platform dependent components 604 according to the individual customer's native platform. The developer can utilize the same high-level abstract language to code a particular platform dependent component 604 for different customers with different native platforms.

FIG. 6 illustrates platform dependent component A 606 for Security Policy, platform dependent component B 608 for Exception Handling, platform dependent component C 610 for Data Types, platform dependent component D 612 for Module Definitions, platform dependent component E 614 for Service Framework, platform dependent component F 616 for User Interface, platform dependent component G 618 for Services, platform dependent component H 620 for Service Calling, platform dependent component I 622 for Business Processes, platform dependent component J 624 for Business Rules, platform dependent component K 626 for State Machines, and platform dependent component L 628 for Extension Points. These are merely examples of different platform dependent components. A subset of the platform dependent components illustrated, a combination of the platform dependent components illustrated, or completely different platform dependent components may be utilized.

An example of a developer utilizing high-level abstract languages would involve the developer utilizing XML to code the platform dependent component A 606 for Security Policy and Java to code the platform dependent component B 608 for Exception Handling. In other words, the security policy on different customer systems may be significantly different, but the developer can utilize XML to code the platform dependent component A 606 for Security Policy customers with different platforms. Further, the developer can utilize Java to code the platform dependent component B 608 for Exception Handling for different customers. While a different high-level abstract language could potentially be utilized to code each platform dependent component 604, one high-level abstract language could also be used for all of the platform dependent components 604. In addition, a set of high-level abstract languages can be utilized so that each high-level abstract language may be utilized to code more than one of the platform dependent components 604. For example, XML and Java can be utilized for the plurality of platform dependent components 604 so that half of the platform dependent components 604 are coded in XML and half of the platform dependent components 604 are coded in Java. In an alternative embodiment, some of the platform dependent components illustrated in FIG. 6 may not be native to an individual customer's platform, and the developer may choose to classify those components as platform independent components.

The enterprise module construction system 600 provides the platform dependent components 604, coded in the high-level abstract language, to a component transmogrifier 630. Further, the component transmogrifier 630 has data regarding the platform specifics of the particular customer for which the enterprise module A 351 is being developed. Accordingly, the component transmogrifier 630 can automatically convert the code written by the developer for the platform dependent components 604 into platform dependent source code 634. In other words, the developer can utilize the same high-level abstract language to generate platform dependent source code for different platforms. The developer does not have to waste the resources that would be needed to become familiar with the computer languages utilized for each customer's platform.

The component transmogrifier 630 can output a plurality of platform dependent artifacts 632. For example, the platform dependent source code 634 is a platform dependent artifact. Metadata 636 is also an example of a platform dependent artifact. The metadata 636 can be any data associated with the enterprise module A 351. For instance, the metadata 636 can provide information for a graphical user interface, such as field names. Other examples of platform dependent artifacts 632 are deployment descriptors 638, XML Schema Definition 640 ("XSD"), Web Services Description Language 642 ("WSDL"), Bytecode 644, and International resources 646. The International resources include mainly localizable artifacts, such as localized strings, dialogs, screens, etc.

Further, the plurality of platform dependent artifacts 632, such as the platform dependent source code 634, are provided to the compiler and linker 648 so that the platform dependent source code 634 can be compiled and linked with the platform independent source code 602. As a result, enterprise object code 654 is generated.

In order to help facilitate software development, the module construction system 600 provides libraries of pre-constructed code that the developer can utilize when programming in the native platform computer languages. As the module construction system 600 is portable, a developer can access pre-constructed routines for any of the native platform computer languages that are utilized. Further, an intersection library 650 includes the set of routines that is commonly available in each of the native platform computer language libraries. An intersection occurs when the same name of a function appears through each of the native computer language libraries that are being utilized. For instance, a function to change the orientation of an object may be called "reorient" in both C# and Java. Even though the underlying code for the function "reorient" may be different in C# than in Java, a compiler that supports either C# or Java can be utilized to change the orientation of the object. However, if the name of the function in C# is "reorient" and the name of the function in Java is "rotate," the two functions may be found in the portable library 652. Further, if there is a function in C# called "reorient," but no function in Java, then a function is composed in Java and placed in the portable library 652. In one embodiment, the newly written function has the same name as the corresponding function in C#. In an alternative embodiment, the newly written function has a different name than the corresponding function in C#. The intersection library 650 and the portable library 652 are provided to the compiler and linker 648 so that the routines that are called from the developer's code can be found during the compilation and linkage phase.

The enterprise object code 654 is platform specific so that the enterprise object code 654 can be run on the customer's computer network 513 (FIG. 5). Further, as illustrated in FIG. 6, the enterprise object code 654 is provided to a packaging system 652, which adds additional information to the enterprise object code 654 to generate the enterprise module A 351. Accordingly, the enterprise module A 351 can now be utilized for the specific platform at the customer site 310 and can also be seamlessly integrated with other software at the customer site 310.

Some of the platform dependent artifacts 632 are provided after the compiling and linking phase. For instance, metadata may be provided to the compiler and linker 648, the enterprise object code 654, and the packaging system 656. The metadata can include information specific to the customer's platform. Accordingly, the metadata can help compile, link, and package the code for the enterprise module A 351 so that the enterprise module A 351 can run on the customer's native platform. Further, the metadata can be provided to the enterprise module A 351 at run time so that the enterprise module A 351 can execute according to customer specific information.

In addition, the deployment descriptors 638, XSD 640, WSDL 642, Bytecode 644, and International resources 646 can also be added to the enterprise object code 654 and to the packaging system 656. These additional platform dependent artifacts may provide additional information and/or code that assists the enterprise module A 351.

Figure 7:
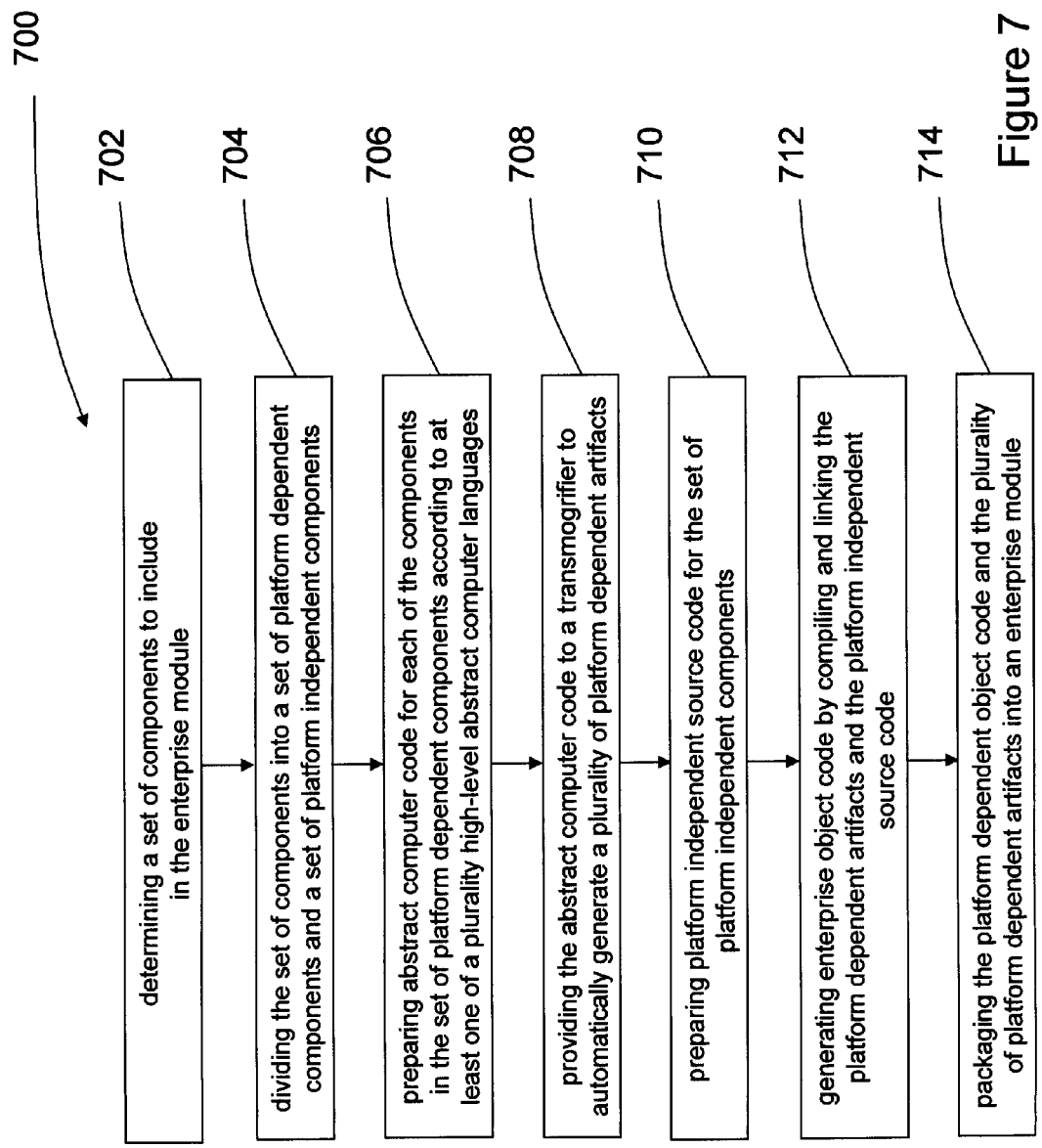
FIG. 7 illustrates a process in which the enterprise module can be generated.

FIG. 7 illustrates a process 700 in which the enterprise module A 351 can be generated. At a process block 702, a set of components to be included in the enterprise module A 351 is determined. Further, at a process block 704, the set of components is divided into a set of platform dependent components and a set of platform independent components. In addition, at a process block 706, abstract computer code is prepared for each of the components in the set of platform dependent components according to at least one of a plurality of high-level abstract computer languages. At a process block 708, the abstract computer code is provided to a transmogrifier to automatically generate a plurality of platform dependent artifacts. The plurality of platform dependent artifacts can include platform dependent source code, metadata, deployment descriptors, XSD, WSDL, Bytecode, and International resources. Further, at a process block 710, platform independent source code is prepared for the set of platform independent components. In addition, at a process block 712, enterprise object code is generated by compiling and linking the platform independent source code and at least a subset of a plurality of platform dependent artifacts. For instance, the subset of the plurality of platform dependent artifacts can include the platform dependent source code. Finally, at a process block 714, the platform dependent object code and the plurality of platform dependent artifacts are packaged into an enterprise module.

At least some embodiments, and the different structure and functional elements described herein, can be implemented using hardware, firmware, programs of instruction, or combinations of hardware, firmware, and programs of instructions.

In general, routines executed to implement the embodiments can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects.

While some embodiments have been described in the context of fully functioning computers and computer systems, those skilled in the art will appreciate that various embodiments are capable of being distributed as a program product in a variety of forms and are capable of being applied regardless of the particular type of machine or computer-readable media used to actually effect the distribution.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks, (DVDs), etc.), among others. The instructions can be embodied in digital and analog communication links for electrical, optical, acoustical or other forms of propagated signals, such as carrier waves, infrared signals, digital signals, etc.

A machine readable medium can be used to store software and data which when executed by a data processing system causes the system to perform various methods. The executable software and data can be stored in various places including for example ROM, volatile RAM, non-volatile memory and/or cache. Portions of this software and/or data can be stored in any one of these storage devices.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

Some aspects can be embodied, at least in part, in software. That is, the techniques can be carried out in a computer system or other data processing system in response to its processor, such as a microprocessor, executing sequences of instructions contained in a memory, such as ROM, volatile RAM, non-volatile memory, cache, magnetic and optical disks, or a remote storage device. Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), or firmware such as electrically erasable programmable read-only memory (EEPROM's).

In various embodiments, hardwired circuitry can be used in combination with software instructions to implement the embodiments. Thus, the techniques are not limited to any specific combination of hardware circuitry and software nor to any particular source for the instructions executed by the data processing system.

In this description, various functions and operations are described as being performed by or caused by software code to simplify description. However, those skilled in the art will recognize what is meant by such expressions is that the functions result from execution of the code by a processor, such as a microprocessor.

Although some of the drawings illustrate a number of operations in a particular order, operations which are not order dependent can be reordered and other operations can be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications can be made thereto without departing from the broader spirit and scope of the following claims. The specification and drawings are, accordingly, to be regarded in an illustrative sense rather than a restrictive sense.

The invention claimed is:

1. A non-transitory machine readable medium having stored thereon a set of instructions which when executed perform a method comprising:
   determining a set of components to include in an enterprise module;
   dividing the set of components into a set of platform dependent components and a set of platform independent components;
   preparing abstract computer code for each of the components in the set of platform dependent components according to at least one of a plurality of high-level abstract computer languages;
   automatically generating a plurality of platform dependent artifacts from the abstract computer code;
   preparing platform independent source code for the set of platform independent components;
   generating enterprise object code by compiling and linking the platform independent source code and at least a subset of the plurality of platform dependent artifacts with an intersection library and a portable library; and
   packaging the platform dependent object code and the plurality of platform dependent artifacts into an enterprise module.

2. The machine readable medium of claim 1, wherein the plurality of platform dependent artifacts includes platform dependent source code.

3. The machine readable medium of claim 2, wherein the subset of the plurality of platform dependent artifacts includes the platform dependent source code.

4. The machine readable medium of claim 1, wherein the plurality of platform dependent artifacts includes metadata.

5. The machine readable medium of claim 1, wherein the plurality of platform dependent artifacts includes deployment descriptors.

6. The machine readable medium of claim 1, wherein the plurality of platform dependent artifacts includes code written in XML Schema Definition.

7. The machine readable medium of claim 1, wherein the plurality of dependent artifacts includes code written in Web Services Description Language.

8. The machine readable medium of claim 1, wherein the plurality of dependent artifacts includes Bytecode.

9. The machine readable medium of claim 1, wherein the plurality of dependent artifacts includes International resources.

10. The machine readable medium of claim 1, wherein the plurality of high-level abstract computer languages includes XML.

11. The machine readable medium of claim 1, wherein the plurality of high-level abstract computer languages includes Java.

12. The machine readable medium of claim 1, wherein the platform independent source code is a subset of a plurality of platform independent computer environments.

13. The machine readable medium of claim 12, wherein the subset of the plurality of platform independent computer languages can be compiled on a compiler that supports any of the plurality of platform independent computer environments.

14. The machine readable medium of claim 12, wherein the plurality of platform independent computer environments includes .Net.

15. The machine readable medium of claim 12, wherein the plurality of platform independent computer environments includes J2EE.

16. The machine readable medium of claim 1, wherein the method further comprises packaging the enterprise object code into an enterprise module.

17. The machine readable medium of claim 16, wherein the enterprise module can be integrated with a customer's platform dependent computer application.

18. A computer-implemented method comprising:
   determining a set of components to include in an enterprise module;
   dividing the set of components into a set of platform dependent components and a set of platform independent components;
   preparing abstract computer code for each of the components in the set of platform dependent components according to at least one of a plurality of high-level abstract computer languages;

automatically generating platform dependent source code, by the computer, from the abstract computer code;

preparing platform independent source code for the set of platform independent components;

generating enterprise object code, by the computer, by compiling and linking the platform dependent source code and the platform independent source code with an intersection library and a portable library; and packaging the enterprise object code into the enterprise module.

19. The method of claim 18, wherein the enterprise module can be integrated with a customer's platform dependent computer application.

20. The method of claim 18 further comprising automatically generates metadata in addition to the platform dependent source code.

* * * * *

UNITED STATES PATENT AND TRADEMARK OFFICE
CERTIFICATE OF CORRECTION

PATENT NO. : 7,886,018 B2  
APPLICATION NO. : 11/426264  
DATED : February 8, 2011  
INVENTOR(S) : Tseitlin et al.

Page 1 of 1

It is certified that error appears in the above-identified patent and that said Letters Patent is hereby corrected as shown below:

On the title page, in column 2, under "Other Publications", line 3, delete "fom" and insert -- from --, therefor.

In column 1, line 62, delete "fine" and insert -- find --, therefor.

In column 14, line 7, in Claim 20, delete "generates" and insert -- generating --, therefor.

Signed and Sealed this
Twenty-seventh Day of September, 2011

David J. Kappos
*Director of the United States Patent and Trademark Office*